United States Patent
Miura et al.

(10) Patent No.: US 10,460,225 B2
(45) Date of Patent: Oct. 29, 2019

(54) MARKING DEVICE AND MARKING METHOD

(71) Applicant: SATO HOLDINGS KABUSHIKI KAISHA, Tokyo (JP)

(72) Inventors: Kuniyuki Miura, Saitama (JP); Masatoshi Takano, Saitama (JP); Hideyuki Maeda, Saitama (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 494 days.

(21) Appl. No.: 15/116,011

(22) PCT Filed: Jul. 28, 2014

(86) PCT No.: PCT/JP2014/069842
§ 371 (c)(1),
(2) Date: Aug. 2, 2016

(87) PCT Pub. No.: WO2015/145796
PCT Pub. Date: Oct. 1, 2015

(65) Prior Publication Data
US 2017/0169324 A1  Jun. 15, 2017

(30) Foreign Application Priority Data

Mar. 25, 2014  (JP) .................. 2014-061572
Mar. 31, 2014  (JP) .................. 2014-071344

(51) Int. Cl.
| | |
|---|---|
| *H05K 3/00* | (2006.01) |
| *G06K 19/077* | (2006.01) |
| *B65H 33/00* | (2006.01) |
| *B65H 43/04* | (2006.01) |
| *B26D 3/14* | (2006.01) |

(Continued)

(52) U.S. Cl.
CPC ......... *G06K 19/07718* (2013.01); *B26D 3/14* (2013.01); *B26D 5/28* (2013.01); *B26F 1/02* (2013.01); *B65H 33/00* (2013.01); *B65H 43/04* (2013.01); *B65H 45/28* (2013.01); *G06K 1/121* (2013.01); *B65H 2301/4214* (2013.01); *B65H 2301/45* (2013.01); *B65H 2301/5111* (2013.01); *B65H 2301/5152* (2013.01); *B65H 2553/52* (2013.01); *B65H 2701/1113* (2013.01);

(Continued)

(58) Field of Classification Search
CPC .... B26D 3/14; B26D 5/28; B26F 1/02; B65H 33/00; B65H 43/04; B65H 45/28; G06K 1/121; G06K 19/07718
See application file for complete search history.

(56) References Cited

U.S. PATENT DOCUMENTS

| | | | | |
|---|---|---|---|---|
| 5,643,017 A | * | 7/1997 | Jinno | .............. H01R 13/187 439/843 |
| 7,874,575 B2 | * | 1/2011 | Fukuyama | ............ B60R 21/217 280/728.2 |

FOREIGN PATENT DOCUMENTS

| | | |
|---|---|---|
| EP | 2 602 122 A1 | 6/2013 |
| JP | 7-23752 U | 5/1995 |

(Continued)

*Primary Examiner* — Paul D Kim
(74) *Attorney, Agent, or Firm* — Foley & Lardner LLP (57) ABSTRACT

To provide a marking device that enables to easily find a tag determined as defective (RFID error, etc.) among a plurality of tags that are stacked or the like. The marking device to use with a sheet includes cut and raising part for forming, as a failure process, a cut and raised section to be positioned at an edge of the sheet having been found the defect.

26 Claims, 11 Drawing Sheets

(51) Int. Cl.
*B26F 1/02* (2006.01)
*B26D 5/28* (2006.01)
*B65H 45/28* (2006.01)
*G06K 1/12* (2006.01)

(52) U.S. Cl.
CPC .............. *B65H 2701/1242* (2013.01); *B65H 2701/1244* (2013.01); *B65H 2701/1942* (2013.01)

(56) References Cited

FOREIGN PATENT DOCUMENTS

| | | |
|---|---|---|
| JP | 2004-86640 A | 3/2004 |
| JP | 2005-125566 A | 5/2005 |
| JP | 2006-172232 A | 6/2006 |
| JP | 2008-094557 A | 4/2008 |
| JP | 2009-120281 A | 6/2009 |

* cited by examiner

MARKING DEVICE AND MARKING METHOD

TECHNICAL FIELD

The present invention relates to a marking device and a marking method.

BACKGROUND ART

So-called RFID (Radio Frequency Identification) is used in various fields. Typical forms of use of the RFID include those using card-shaped and sheet-shaped media. These media have built-in or attached RFID inlays that include an IC chip and an antenna.

In recent years, RFID tags having the RFID inlays built therein or attached thereto have been developed. The RFID tags can be printed with information on their surface by an electronic printer or like device, and enable reading and writing of a large amount of information by for example reader/writers in a non-contact state with the RFID inlay. The RFID tags are hung on products by passing thread or the like through a tag hole formed on an upper part of the RFID tags, and are use as tags.

However, since the RFID inlay may break and become unusable during manufacturing processes or before use, it is necessary to inspect and classify the RFID tags into good and defective ones, by inspection means such as a reader/writer, before shipping as a product.

For example Patent Literature 1 discloses a device that, in order to prevent any shipping of RFID tags whose RFID inlay is broken and is unusable (defected), inspects the RFID tags including an RFID inlay prior to shipping and forms a through hole in those determined as defective.

However, in the case of Patent Literature 1, punched pieces are generated, which thus requires a device to suck in the punched pieces, such as an air hose; this causes the device to become large-scale.

Moreover, for example the following Patent Literature 2 discloses a technique of applying a mark with for example an inkjet printer, to an IC inlet determined as defective from among a plurality of IC inlets drawn out and conveyed successively from an IC inlet roll.

In this case, the mark applied to the defective IC inlet is one made by oil-based ink, and this IC inlet can be distinguished in a case in which the mark can be seen by eyesight.

Therefore, for example, there was the inconvenience that it was difficult to distinguish the IC inlet from the plurality of IC inlets in a case in which the IC inlet is stacked with other IC inlets on top of each other. Moreover, in the case in which the IC inlet is stacked with other IC inlets on top of each other, there also was the inconvenience that a plurality of IC inlets that are printed or written with different information cannot be distinguished easily.

PATENT LITERATURE

Patent Literature 1: Japanese Patent Laid-Open No. 2006-172232
Patent Literature 2: Japanese Patent Laid-Open No. 2004-86640

SUMMARY OF INVENTION

Problem to be Solved by the Invention

The present invention was accomplished in view of the above situations, and has an object to provide a marking device and a marking method that enables to easily find a tag determined as defective (such as an RFID error) from among a plurality of tags stacked or the like, or enabling to simplify classification of the plurality of tags stacked or the like. Moreover, the present invention has an object to provide a marking device and a marking method that forms a cut and raised section in the tag and can securely form a fold on the cut and raised section to easily find the tag determined as defective (such as an RFID error), or enables to simplify classification of the plurality of tags stacked or the like.

Solution to Problem

The present invention is recognized by the following configuration.

(1) A marking device according to a first aspect of the present invention is a marking device to use with a sheet, characterized by including: cut and raising means adapted to form, as a failure process, a cut and raised section positioned on an edge of a sheet having been found a defect.

(2) The marking device of the present invention, in the configuration of (1), is characterized in that the sheet includes an RFID.

(3) The marking device of the present invention, in the configuration of (1) or (2), is characterized in that the cut and raising means forms a plural number of the cut and raised section.

(4) The marking device of the present invention, in the configuration of any one of (1) to (3), is characterized in that the cut and raising means includes: a lower base on which the sheet is conveyed; at least one upper blade disposed above the lower base, adapted to make a cut in the sheet having been found a defect; and a slit provided in the lower base corresponding to the upper blade, allowing for the upper blade to be accepted therein on an upstream side in a conveying direction of the sheet, the slit including a restraint section on a downstream side in the conveying direction of the sheet, the restraint section pressing the cut and raised section of the sheet in a bending direction along with the conveying of the sheet.

(5) The marking device of the present invention, in the configuration of (4), is characterized in that the restraint section has an outline inclining to an inner side of the sheet in a planar view, toward the downstream side in the conveying direction of the sheet.

(6) The marking device of the present invention, in the configuration of (4) or (5), is characterized by further including a roller disposed above the restraint section, disposed to further make a crease on the cut and raised section by pressing the sheet against the lower base.

(7) The marking device of the present invention, in the configuration of any one of (4) to (6), is characterized in that the restraint section is formed by gradually narrowing a width of the slit toward the downstream side in the conveying direction of the sheet.

(8) The marking device of the present invention, in the configuration of any one of (4) to (7), is characterized in that the restraint section is formed by an end angled section of the slit on the downstream side in the conveying direction of the sheet.

(9) The marking device of the present invention, in the configuration of any one of (4) to (8), is characterized in that a plural number of the upper blade and the slit adapted to accept the upper blade is provided in a direction at right angles to the conveying direction of the sheet.

(10) The marking device of the present invention, in the configuration of any one of (6) to (9), is characterized by further including a cutting and stacking section adapted to cut and stack the plurality of sheets having passed a disposed position of the roller.

(11) A marking method according to a second aspect of the present invention is a marking method to use with a sheet, and is characterized by including: a cutting and raising step of forming, as a failure process, a cut and raised section so as to be positioned on an edge of a sheet having been found a defect.

(12) The marking method of the present invention in the configuration of (11) is characterized in that the sheet includes an RFID.

(13) The marking method of the present invention, in the configuration of (11) or (12), is characterized in that the cutting and raising step includes: a step of conveying the sheet on a lower base; a step of making a cut in the sheet having been found a defect, by using at least one upper blade disposed above the lower base; a step of forming a cut and raised section of the sheet by a slit provided in the lower base corresponding to the upper blade, the slit allowing for the upper blade to be accepted therein on an upstream side in a conveying direction of the sheet; and a step of pressing the cut and raised section of the sheet in the bending direction along with the conveying of the sheet, by a restraint section of the slit provided on a downstream side in the conveying direction of the sheet.

(14) The marking method of the present invention, in the configuration of (13), is characterized by further including a step of making a further crease on the cut and raised section by pressing the sheet against the lower base by using a roller disposed above the restraint section.

(15) The marking method of the present invention, in any one of the configurations of (11) to (14), is characterized by further including a cutting and stacking step of cutting the sheet having been subjected to the cutting and raising step into single leafs, and stacking the plurality of sheets in the single leaf form to be contact with each other.

Effects of the Invention

According to a marking device and a marking method configured as such, it is possible to easily find a tag determined as defective (such as an RFID error) among the plurality of tags stacked or the like.

Moreover, according to a marking device and a marking method configured as such, it is possible to form a cut and raised section and securely make a crease on the cut and raised section, to easily find a tag determined as defective (RFID error).

BRIEF DESCRIPTION OF DRAWINGS

FIGS. 1A-1D are structural views showing a tag forming device to which the present invention is applied.

FIGS. 2A-2B are structural views showing continuous paper to which the present invention is applied.

FIGS. 5A-5B is a structural view of a marking device including an upper blade driving device and a lower base, the lower base having a roller.

FIGS. 9A-9B are top view showing a relationship between an upper blade driving device and a lower base.

DESCRIPTION OF EMBODIMENTS

Hereinafter, embodiments for carrying out the present invention (hereinafter, embodiments) are described in detail, with reference to the attached drawings. Identical elements throughout the entire description of the embodiments are designated with identical numbers.

(Embodiment 1)

Figure 1A:
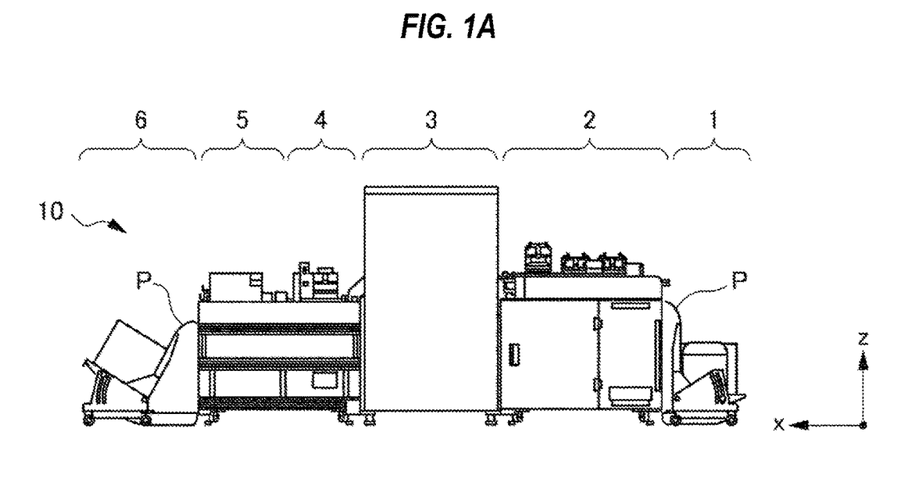
FIG. 1A is an overall view thereof.

FIG. 1A is a view showing an entire tag forming device to which the present invention is applied. As shown in FIG. 1A, a tag forming device 10 includes, from the right side to the left side of the drawing, sequentially, a continuous paper feeding device 1, an encoding device 2, a printing device 3, an inspection device 4, a marking device 5, and a continuous paper discharging device 6.

Figure 1B:
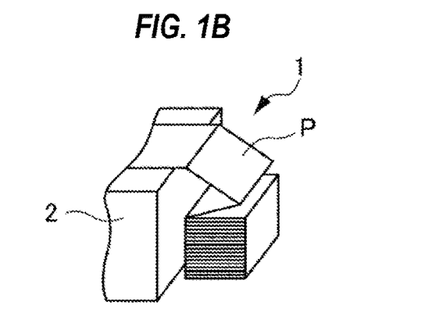
FIG. 1B is a view showing a continuous paper feeding device.
Figure 2A:
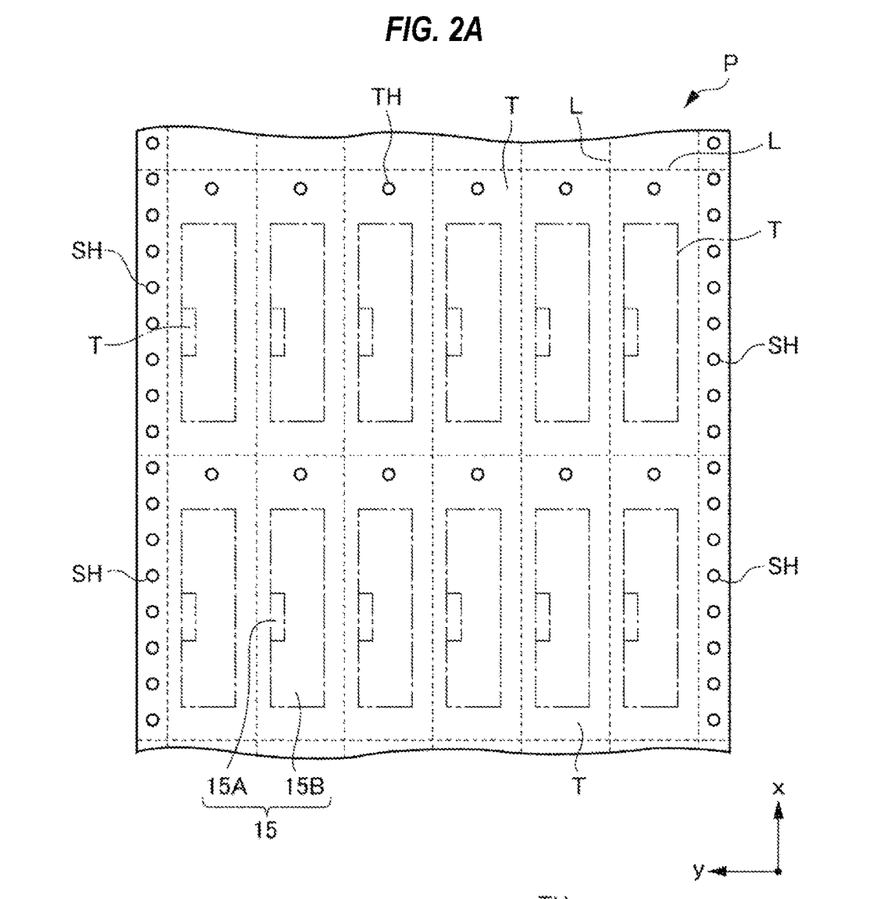
FIG. 2A is a top view thereof.

In the continuous paper feeding device 1, continuous paper P is folded in a "Z" shape form as shown in FIG. 1B having for example perforations serving as its creases, and one end thereof is inserted into the encoding device 2, for the continuous paper P to be conveyed to the printing device 3, the inspection device 4, and the marking device 5, in combination with sprockets not illustrated and conveying means such as a conveyor belt or a conveying roller. In this case, the continuous paper P has timing marks (not illustrated) printed in advance on its back surface at predetermined intervals, to detect a conveyed position of the continuous paper P by a pitch sensor (not illustrated) on the device. The encoding device 2 carries out reading and writing of information with respect to each tag to be formed on the conveyed continuous paper P. FIG. 2A is a planar view of a portion of the continuous paper P, and a plurality (six in the drawing) of tags T (dotted line frames in the drawing) aligned in a width direction of the continuous paper P (y direction in the drawing) is formed successively in a conveying direction (x direction in the drawing). The dotted lines showing outer frames of the tags T are tag cutting lines L, and on one end section of the tags T, for example a tag hole TH for passing through thread is formed. Sprocket holes SH are successively formed in the vicinity of each sides of the continuous paper P along the conveying direction, and the continuous paper P is conveyed by driving of a sprocket (conveying means) that engages with the sprocket holes SH. Moreover, in the continuous paper P, the so-called RFID inlays 15 are built in or laminated on formation regions of the tags T, and these RFID inlays 15 are configured to include an IC chip 15A and an antenna 15B. The continuous paper P fed to the continuous paper feeding device 1 is not limited to that folded in the "Z"-shape as described above, and may be one folded in other forms or may be wound in a rolled form.

Figure 1C:
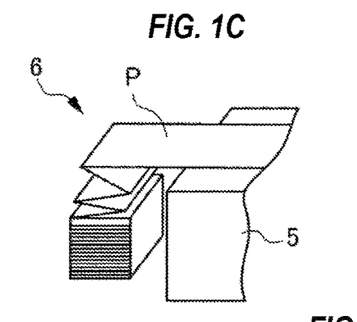
FIG. 1C is a view showing a continuous paper discharging device.
Figure 1D:
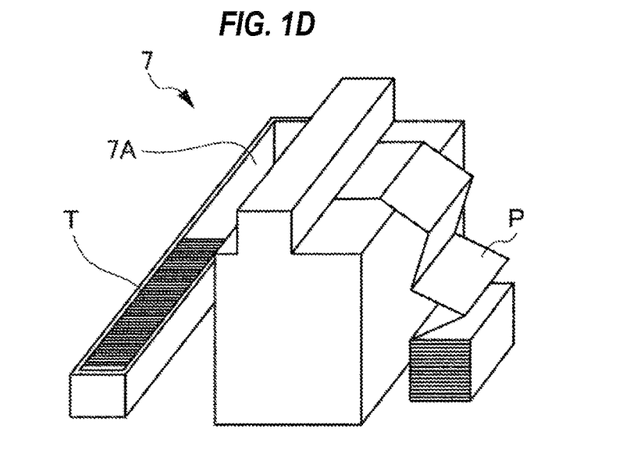
FIG. 1D is a view showing a cutting and stacking device.
Figure 2B:
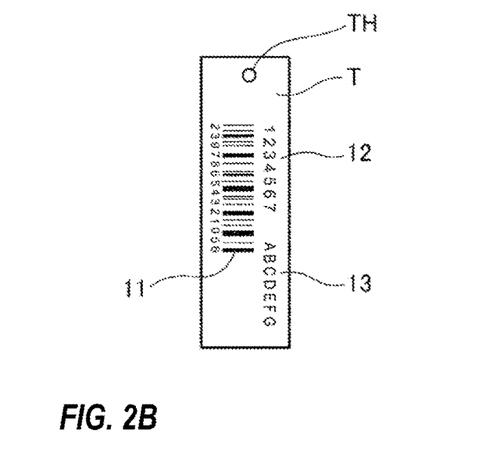
FIG. 2B is a view showing a barcode and the like printed on a surface of the continuous paper per tag.

Returning back to FIG. 1A, the printing device 3 carries out printing onto the conveyed continuous paper P on its surface by for example toner. On the surface of each tag T in the continuous paper P, for example, a barcode 11, a number 12, a letter 13, and other information are to be printed, as shown in FIG. 2B. The inspection device 4 inspects operations of the RFID inlays 15 on the basis of an output of the encoding device 2. The marking device 5 puts a mark on a tag (defective tag) T having been found as defective (such as an RFID error), in response to an inspection result of the inspection device 4, by making a cut to form a cut and raised section, as a failure process. Detailed configurations of this marking device 5 will be described later. The continuous paper discharging device 6, as shown in FIG. 1C, folds the continuous paper from the marking device 5 in the "Z"-shape. Here, the continuous paper P folded in the "Z"-shape is usually carried to a cutting and stacking section (device) 7 disposed at a position separate from the tag forming device 10, as shown in FIG. 1D. Furthermore, by inserting one end of the continuous paper P into the cutting and stacking section (device) 7, the continuous paper P is cut per tag T along the tag cutting lines L, and the cut plurality of tags T are stacked inside a box body 7A in a manner having their front and back surfaces in contact with each other.

Figure 3:
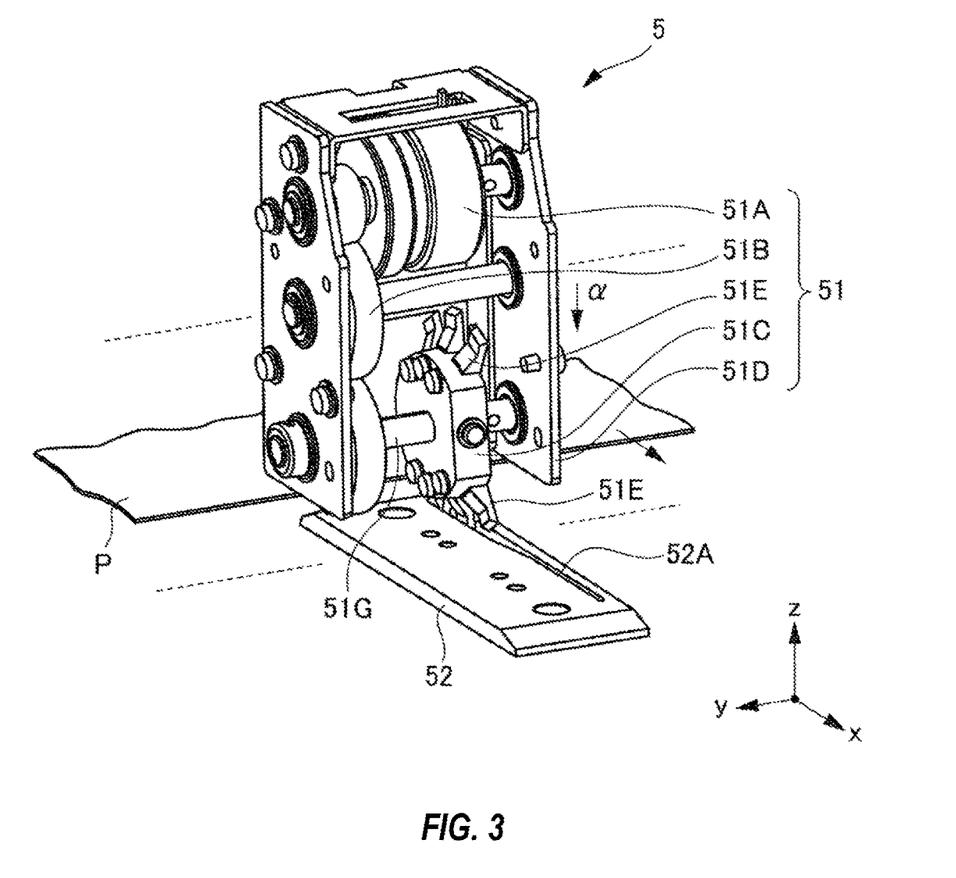
FIG. 3 is a view showing a configuration of a marking device.

Next, the marking device 5 and a marking method thereof are described in details. FIG. 3 is a view showing a configuration of the marking device 5. The marking device 5 shown in FIG. 3 is a view thereof seen from a downstream side in the conveying direction of the continuous paper P (x direction in the drawing).

FIG. 3 shows one marking device 5 of six that are arranged in parallel in the y direction in the drawing. The marking device 5 is provided corresponding to the number of tags T formed in the width direction of the continuous paper P (y direction in the drawing). That is, as shown in the top view of FIG. 9A, six of the marking devices 5 are provided in parallel in a direction at right angles to (y direction in the drawing) the conveying direction of the continuous paper (x direction in the drawing). The marking devices 5 are each configured to include an upper blade driving device 51 shown by the dotted line frames, and a lower base 52 disposed extending from below the upper blade driving device 51 in the conveying direction of the continuous paper P (x direction in the drawing) by a predetermined length, as one of the cut and raising means.

Returning back to FIG. 3, the marking device 5 includes the upper blade driving device 51 above an upstream side of the lower base 52 on which the continuous paper P is conveyed. The upper blade driving device 51 arranges a clutch 51A on its upper stage, a gear 51B on its middle stage, and an upper blade rotating body 51C on its lower stage, and central axes thereof are made parallel to each other and are supported in a rotatable manner in a supporting body 51D.

The upper blade rotating body 51C is attached with a plurality (for example six in the drawing) of upper blades 51E on its circumferential side plane, as one of the cut and raising means. Two sets of the upper blades 51E are provided, which one set is three upper blades 51E adjacent in a circumferential direction, and the sets of the upper blades 51E are provided on opposing planes sandwiching a central axis 51G of the upper blade rotating body 51C.

Along with the conveying of the continuous paper P, one set of the upper blades 51E makes a cut in one tag T, and the other set of the upper blades 51E makes a cut in a subsequent tag T; as such, the operations are made to repeat.

On the other hand, the lower base 52 has a slit 52A formed in proximity to one of its longitudinal directional sides, as one of the cut and raising means. The slit 52A is configured in such a manner that when the tag T of the continuous paper P is positioned above the lower base 52 and the upper blade rotating body 510 of the upper blade driving device 51 rotates, the one set of the upper blades 51E are accepted (inserted therein). Accordingly, three cuts arranged in a line in the conveying direction are formed on the tag T. In FIG. 3, in order to clarify the state of the slit 52A accepting the one set of the upper blades 51E, the tag T of the continuous paper P is shown in a state prior to being positioned on the lower base 52 (in a state not yet positioned above the lower base 52).

Figure 4A:
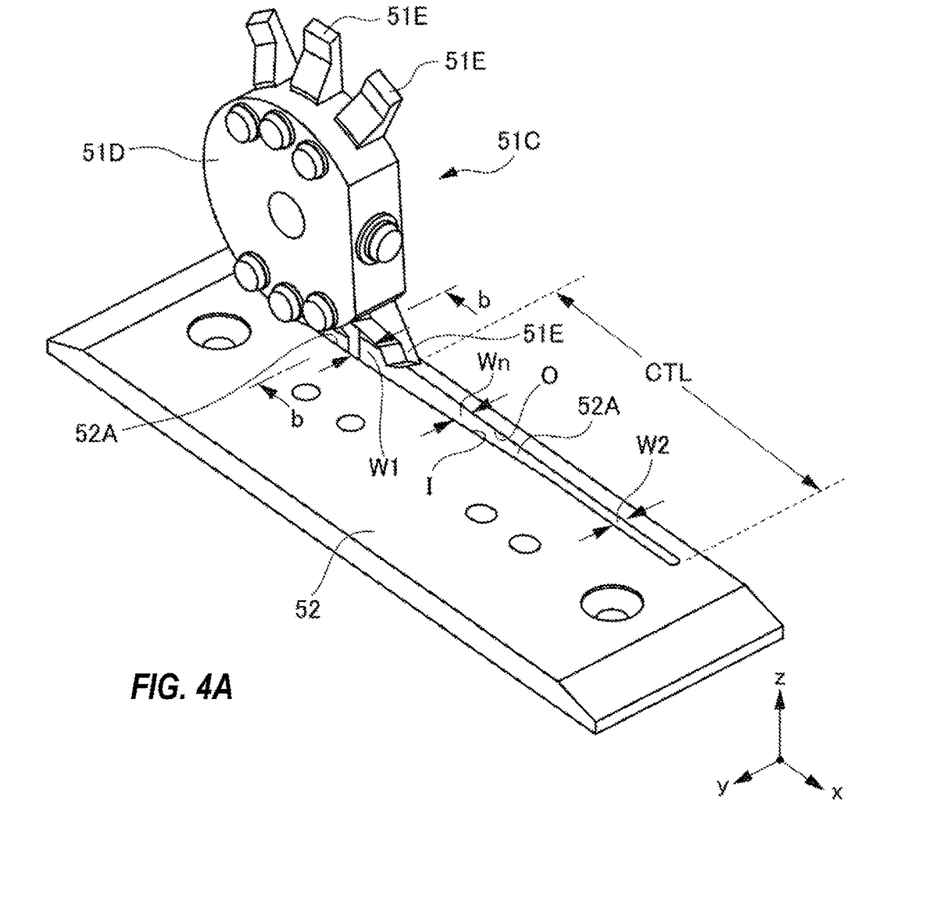
FIG. 4A is an enlarged view showing a relationship between an upper blade of an upper blade rotating body, and a slit.
Figure 4B:
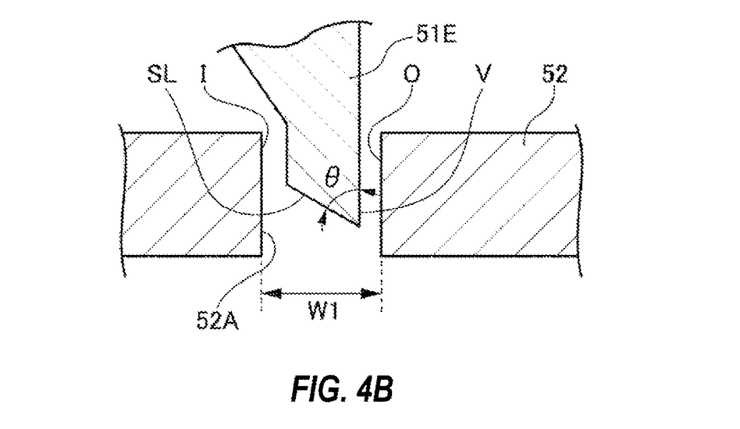
FIG. 4B is a sectional view taken on line b-b in FIG. 4A.

FIG. 4A is an expanded view showing a relationship between the upper blades 51E of the upper blade rotating body 51C, and the slit 52A. FIG. 4B is a sectional view taken on line b-b in FIG. 4A. As shown in FIGS. 4A-4B, the slit 52A is formed having a width W1 enough to accept the upper blades 51E directly below the upper blade rotating body 51C.

Moreover, as shown in FIG. 4B, a tip of the upper blade 51E is of an angle θ (0°<θ<90°). That is, the upper blades 51E are formed having a perpendicular plane V proximate to a longitudinal direction side of the lower base 52, and an inclined plane SL at an angle θ to the perpendicular plane V, inclined toward a center side of the lower base 52. When the upper blades 51E are formed as such, the part in the tag T having the cut as the failure process (hereinafter, called a cut and raised section T0) can be bent to the center side of the lower base 52 (see FIG. 6A).

Returning back to FIG. 4A, the slit 52A directly below the upper blade rotating body 51C is further formed extending in the conveying direction of the continuous paper P (x direction in the drawing). That is, the slit 52A is formed as a narrow slit narrowing in width toward the downstream side in the conveying direction of the tag T. The part where the width of the slit 52A narrows functions as a restraint section CTL for bending the cut and raised section T0 of the tag along with the conveying of the tag. That is, the restraint section CTL of an extending end section of the slit 52A has a width Wn in which the slit 52A extending from the slit 52A with the width W1 gradually narrows in the conveying direction from the width W1 to eventually a width W2, and the further continuing slit 52A has an outline formed to have the width W2. In this case, in a top view, the inner side surface O of the slit 52A on a proximate longitudinal directional side of the lower base 52 extends in a straight line, and an inner side surface I on a central side of the lower base 52 changes to have a width W1, Wn, W2 with respect to the inner side surface O on the longitudinal direction side of the lower base 52.

Figure 5A:
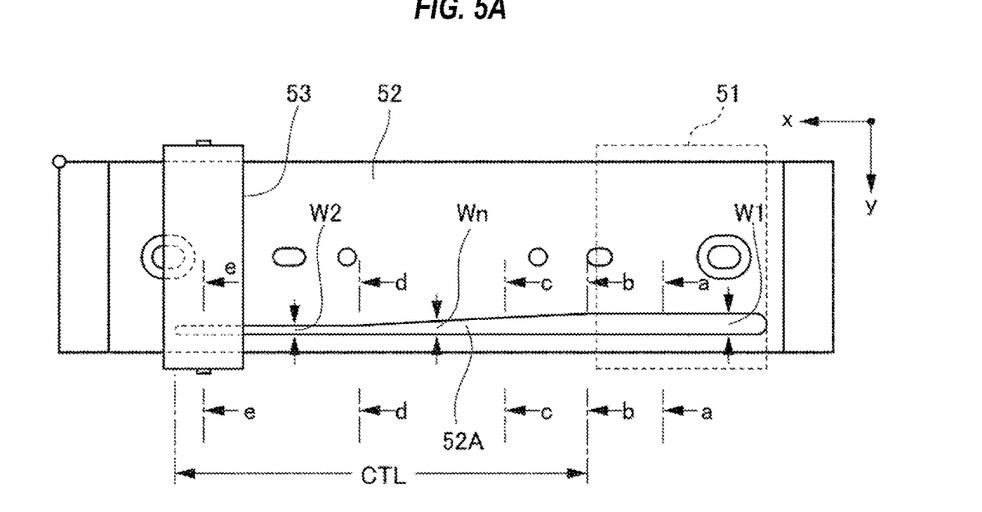
FIG. 5A is a top view thereof.
Figure 5B:
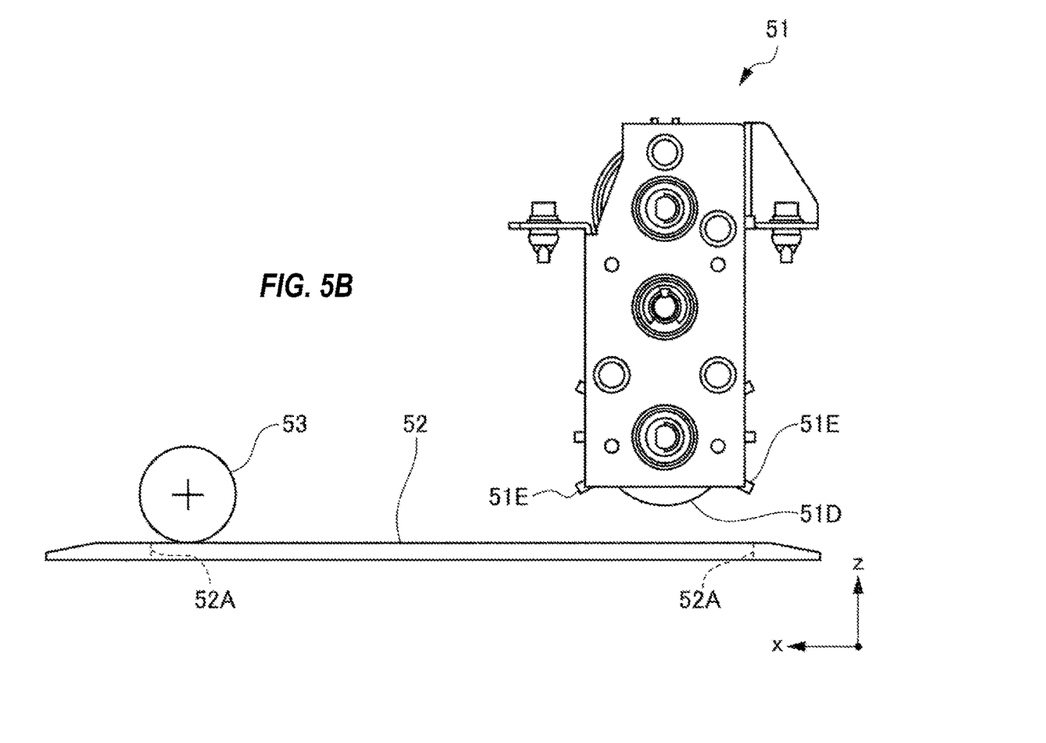
FIG. 5B is a side view thereof.

Moreover, as shown in FIGS. 5A-5B, a roller 53 is disposed on the downstream side in the conveying direction of the lower base 52 and above the restraint section CTL of the slit 52A, and this roller 53 presses the conveyed tag T against the lower base 52. FIG. 5A is a top view, FIG. 5B is a side view, and in FIG. 5A, the upper blade driving device 51 is shown by dotted line frames. As clear from FIGS. 5A-5B, the slit 52A extending from below the upper blade driving device 51 to the downstream side in the conveying direction is formed extending up to below the roller 53.

Here described is a state (step) that the cut and raised section T0 of the tag T formed by the upper blade driving device 51 changes within the slit 52A in a process in which the tag T is conveyed on the lower base 52, with reference to FIGS. 6A-6E.

FIGS. 6A-6E are sectional views taken on lines a-a, b-b, c-c, d-d, e-e of FIG. 5A, respectively.

Figure 6A:
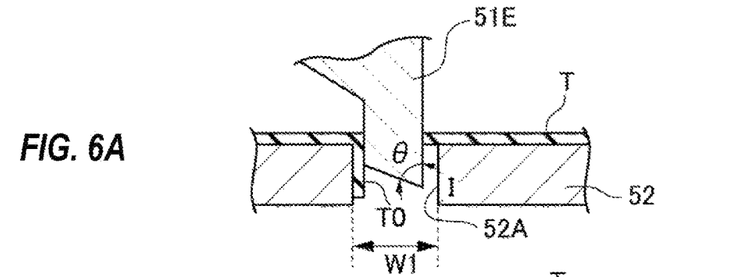
FIGS. 6A-6E are sectional views showing changes within the slit in a process in which a cut and raised section of a tag formed by an upper blade driving device is conveyed.

First, in FIG. 6A, the tag T conveyed to line a-a in FIG. 5A is formed with a cut by the upper blades 51E of the upper blade driving device 51 (see FIGS. 5A-5B). From the shape of the upper blades 51E, the cut and raised section T0 of the tag T is bent to the longitudinal directional side opposite to the center of the lower base 52. In this case, as described above, since the cut is made by one set of the three upper blades 51E of the two sets of the upper blades 51E of the upper blade rotating body 51C in the upper blade driving device 51, the tag T is formed with three cuts.

Figure 6B:
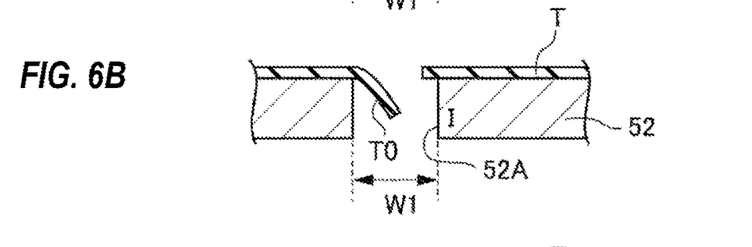

Upon the cutting of the tag T by the upper blades 51E, as shown in FIG. 6B, the bend of the cut and raised section T0 of the tag T conveyed to the line b-b of FIG. 5A is restored slightly within the relatively wide width W1 of the slit 52A, along with the movement of the upper blades 51E in an upwards direction.

Figure 6C:
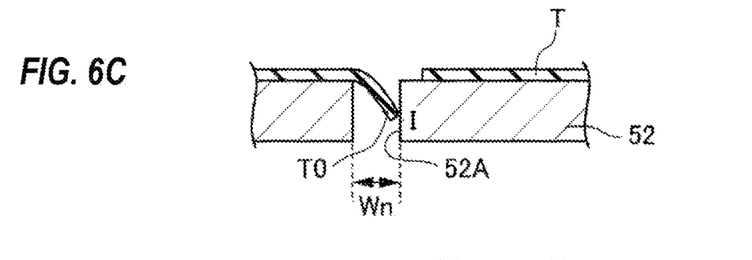

However, the tag T reaches the restraint section CTL by subsequent conveyance thereof, and the cut and raised section T0 is made bent. That is, the tag T conveyed to the line c-c of FIG. 5A has the bending of the cut and raised section T0 of the tag T is again carried out, since the width Wn of the slit 52A narrows as shown in FIG. 6C, due to the pressing force of the inner side plane I on the center side of the lower base 52 of the slit 52A. In this case, the width Wn of the slit 52A becomes narrow as the tag is conveyed, and the bending of the cut and raised section T0 of the tag T is continuously carried out.

Figure 6D:
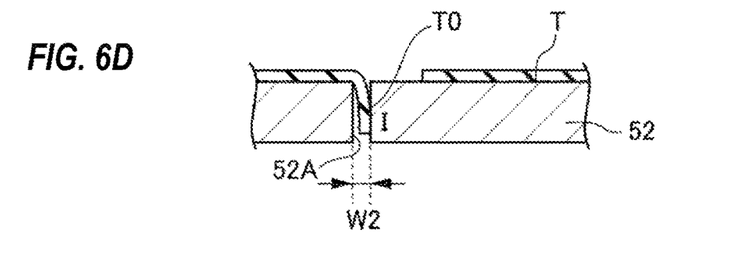

Thereafter, the tag T conveyed to the line d-d in FIG. 5A is positioned so that its cut and raised section T0 is within the slit 52A of the width W2 as shown in FIG. 6D, and the bend of the cut and raised section T0 is made standing substantially perpendicular to the tag T.

Figure 6E:
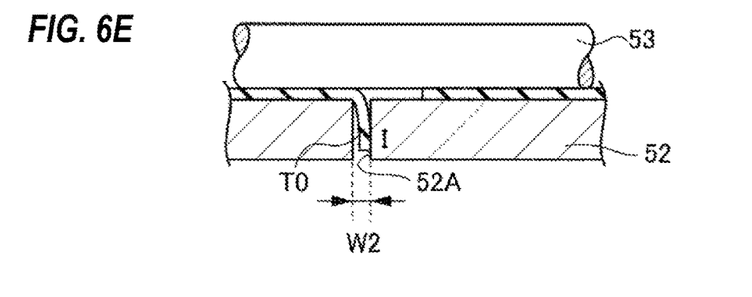

In this state, the tag T conveyed to the line e-e of FIG. 5A is sandwiched between the lower base 52 and the roller 53 in a state in which the cut and raised section T0 is standing substantially perpendicular as shown in FIG. 6E, to securely make a crease on the cut and raised section T0.

Figure 7:
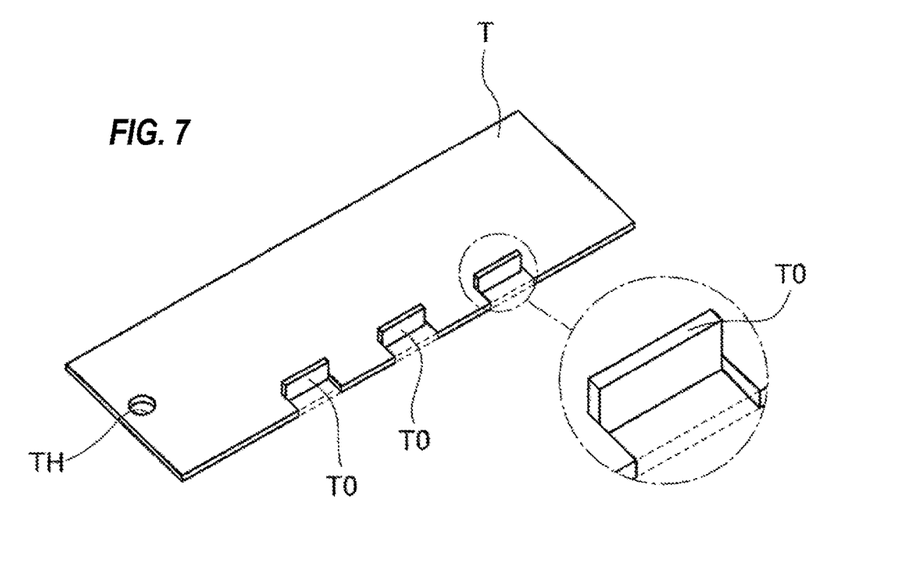
FIG. 7 is a perspective view showing a back surface of a tag on which a cut is made.

As such, the tag T on which a cut is made has three cut and raised sections T0 formed along an edge of one of the longitudinal directional sides as shown in FIG. 7 being a perspective view seen from a back side of the tag T, and these cut and raised sections T0 are formed keeping a state standing substantially perpendicular to the tag T.

Figure 8:
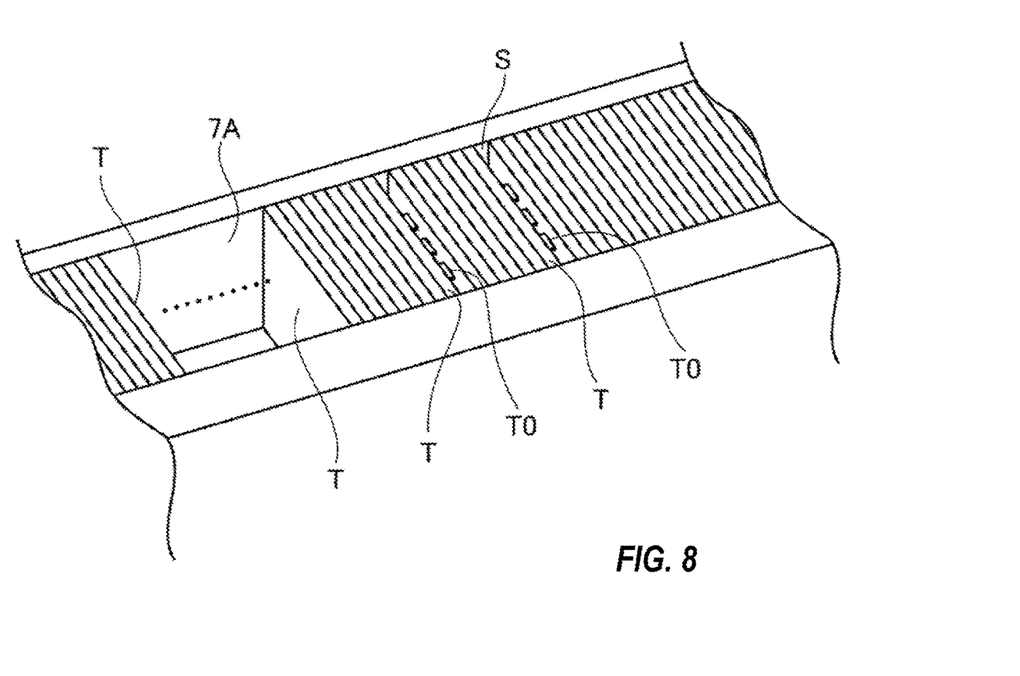
FIG. 8 is a view showing a state in which the tags are stacked in the cutting and stacking section.

FIG. 8 is a view showing a state in which the cuts are made in the tag T deemed as defective (such as an RFID error), and the continuous paper P having passed a disposed position of the roller 53 is cut per tag T and stacked, by the cutting and stacking section (device) 7 (see FIG. 1A). As shown in FIG. 8, the cutting and stacking section (device) 7 includes a box body 7A in which grooves are formed along one direction, and a plurality of tags T is housed in the box body 7A, in a manner having front and back surfaces of the tags T in contact with each other. In this case, the tag T deemed as defective (such as an RFID error) has the cut and raised section T0 bent to one of its sides, and thus a space S is formed between other adjacent tags T by the cut and raised section T0; this thus allows for distinguishing the tag T deemed as defective (such as RFID error) at a glance. Although the present embodiment is made to allow for distinguishing the tag T deemed as defective, it is not limited to this, and may be used for classification purposes. For example, in a case in which different printed information are printed in a plurality of stacked tags T, a tag having a cut and raised section T0 may be positioned at a border part of the printed information, to be used for classification purposes.

(Embodiment 2)

Figure 9A:
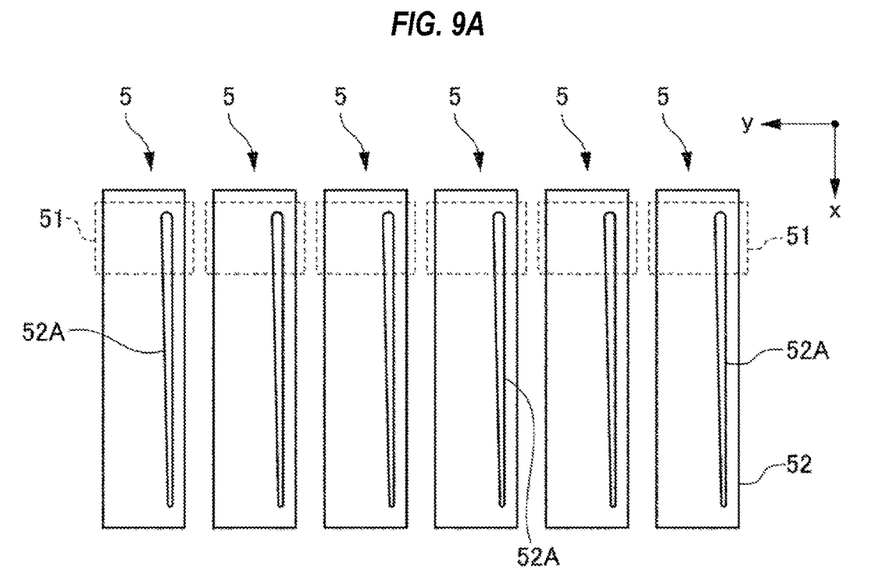
FIG. 9A shows a plurality of lower bases disposed corresponding to the upper blade driving devices.
Figure 9B:
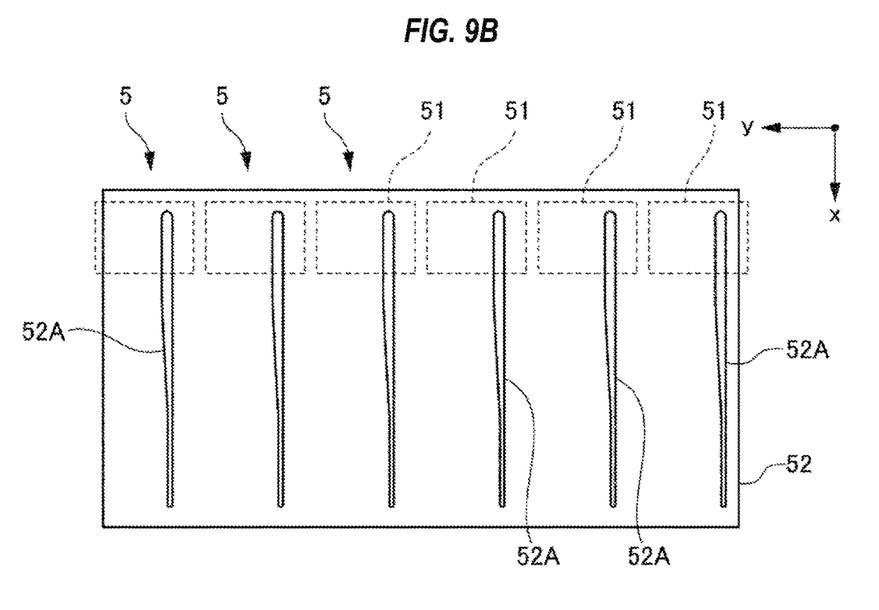
FIG. 9B shows a lower base commonly formed for the upper blade driving devices.

In Embodiment 1, the lower base 52 of the marking device 5 was configured as being provided per upper blade driving device 51, to be paired with each of the upper blade driving devices 51, as shown in FIG. 9A. However, it is not limited to this, and for example, it is of course possible to form the lower bases 52 integrally to each other, as shown in FIG. 9B. This is because, although the upper blade driving devices 51 are driven independently in accordance with the tag T having been found as defective (RFID error), the lower bases 52 may be formed as a shared member, regardless of the operations of the corresponding upper blade driving devices 51.

(Embodiment 3)

Figure 10:
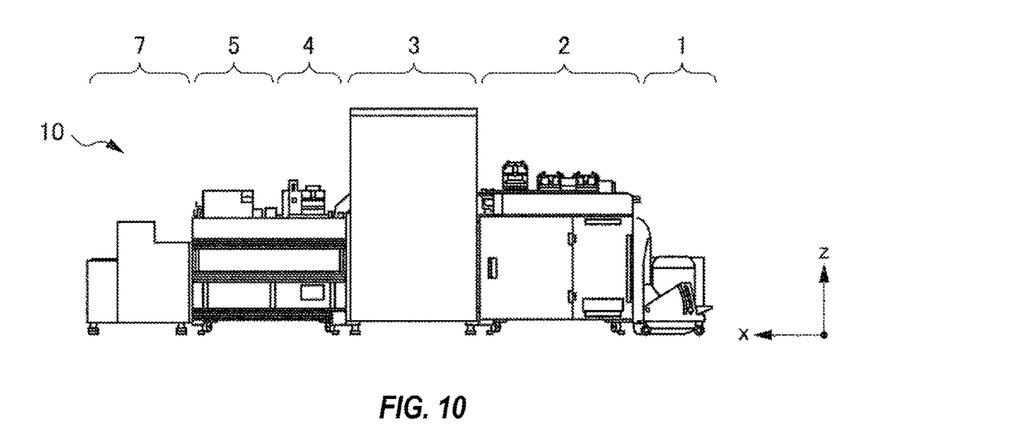
FIG. 10 is a view disposing a cutting and stacking section adjacent to a tag forming device.

In Embodiment 1, as shown in FIG. 1A, the cutting and stacking section (device) 7 is disposed at a position separate to the tag forming device 10. However, it is not limited to this, and it is of course possible to dispose the cutting and stacking section (device) 7 adjacent to the tag forming device 10, and directly send the continuous paper P conveyed from the marking device 5 of the tag forming device 10 to the cutting and stacking section (device) 7, as shown in FIG. 10. In this case, the continuous paper discharging device 6 required in FIG. 1A is made unnecessary. The operation of the cutting and stacking section (device) 7 shown in FIG. 10 is the same as that of the cutting and stacking section (device) 7 shown in FIG. 1D.

(Embodiment 4)

Figure 11:
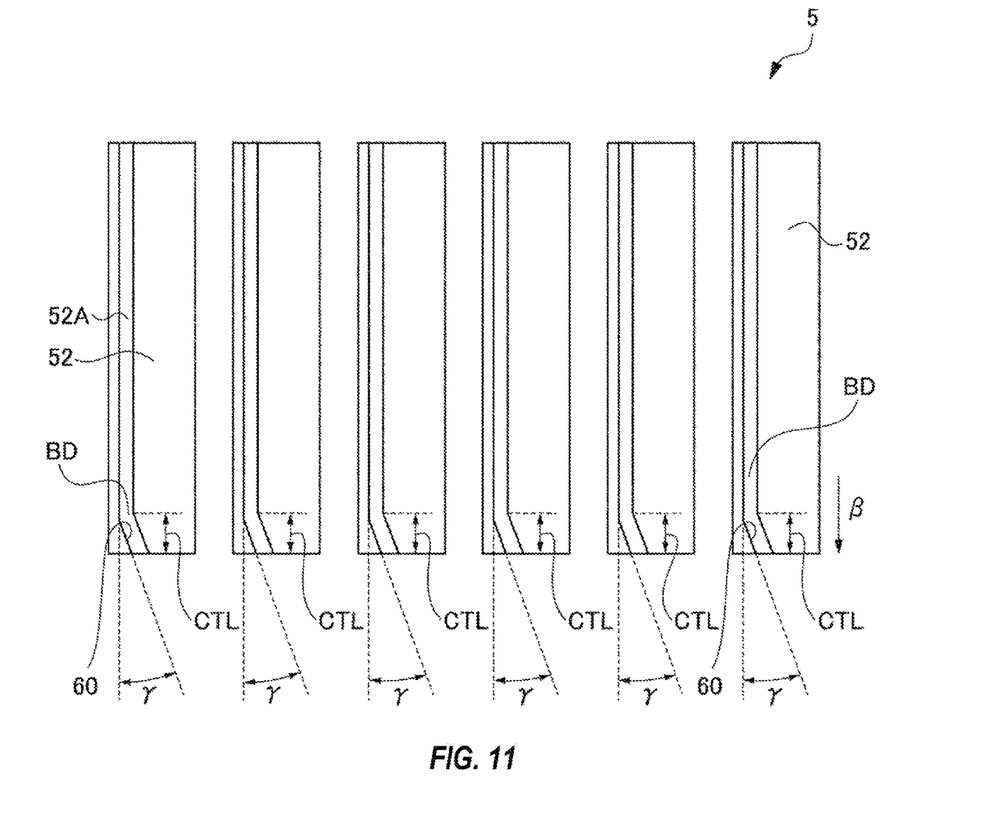
FIG. 11 is a view showing a configuration of a plurality of lower bases disposed corresponding to the upper blade driving devices, according to other embodiments of the marking device.

FIG. 11 is a view showing a configuration of a plurality of lower bases disposed corresponding to upper blade driving devices, according to other embodiments of the marking device 5.

In the present embodiment, although the upper blade rotating body 51C not illustrated is of a substantially same configuration as shown in FIG. 3 to FIGS. 5A-5B, the configurations of the lower base 52, the slits 52A and the like differ, as shown in FIG. 11. That is, there are the lower bases 52, and the slits 52A are formed in the lower bases 52, from end planes on their upstream sides to end planes on their downstream sides. Furthermore, the slits 52A have a bent section BD near the end planes on the downstream side, and the downstream side of the bent section BD of the slit 52A (extending edge of the slit 52A) functions as the aforementioned restraint section CTL. That is to say, the slit 52A extending to the downstream side in a substantially straight line from the upstream side of the lower base 52 has a bent section BD that has an outline bent at an angle $\gamma$ ($0°<\gamma<90°$) with respect to an extended line of the slit 52A up to that position, near the end plane on the downstream side, and the restraint section CTL is formed between this bent section BD to the end plane on the downstream side of the lower base 52.

The lower base 52 configured as such forms a cut and raised section T0 on the tag by an upper blade rotating body 51C not illustrated, in the slit 52A at an upstream side of the bent section BD, and in the slit 52A on the downstream side from the bent section BD, the cut and raised section T0 of the tag T is bent by the pressing force accompanying the conveying of the tag T by a side wall 60 of the slit 52A.

Even configured as such, the same effects as those shown in Embodiment 1 is achievable.

It is notable that a roller not illustrated (equivalent to reference sign 53 in FIGS. 5A-5B) disposed on a downstream side in the conveying direction of the lower base 52 and upper of the restraint section CTL of the slit, enables to securely make the crease on the cut and raised section T0 of the tag T, by pressing the tag T against the lower base 52.

(Embodiment 5)

Figure 12:
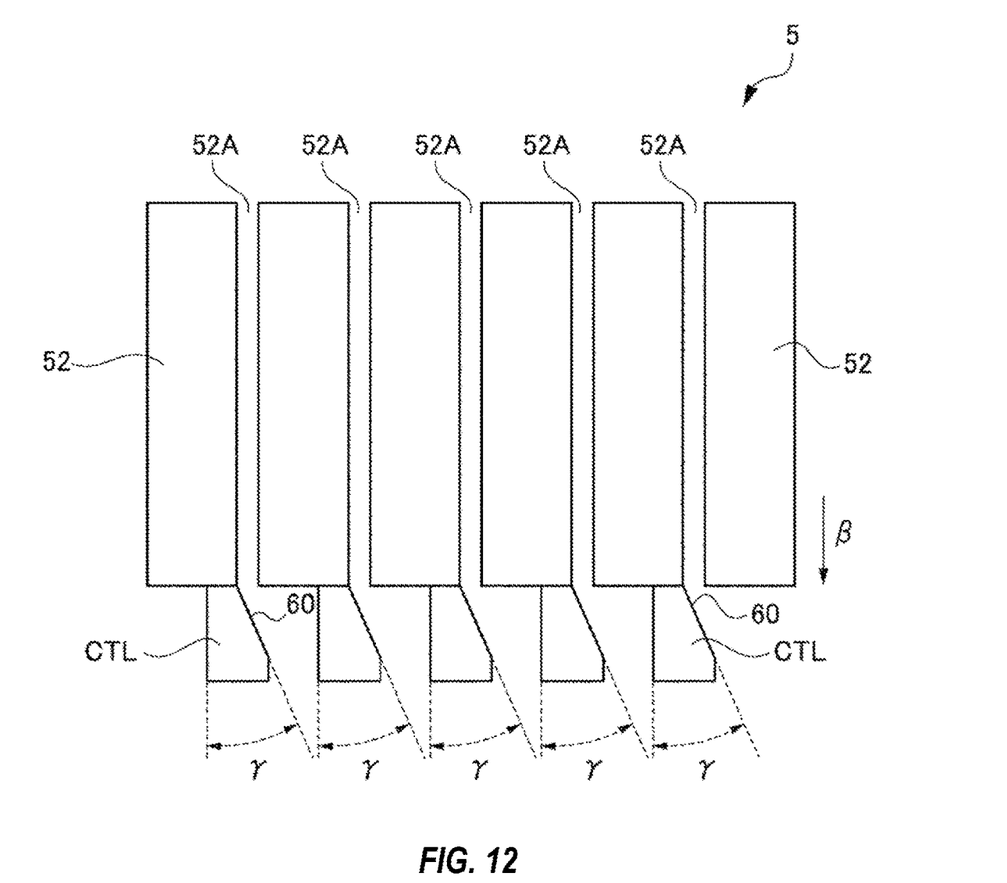
FIG. 12 is a view showing a configuration of a plurality of lower bases disposed corresponding to the upper blade driving devices, according to other embodiments of the marking device.

FIG. 12 is a view showing a configuration of a plurality of lower bases disposed corresponding to upper blade driving devices, according to other embodiments of the marking device 5. In the present embodiment, although an upper blade rotating body 51C not illustrated is of a substantially same configuration as shown in FIGS. 3 to 5A-5B, the configurations of the lower base 52, slit 52A and the like differ, as shown in FIG. 12. That is, the slits 52A are formed by gaps formed between a lower base 52 and other lower bases 52 disposed adjacent to the lower base 52. Accordingly, the slits 52A are formed linearly from an end plane on the upstream side of the lower base 52 to an end plane on the downstream side thereof. Moreover, the continuous paper P conveyed on the lower base 52 is positioned to have the tags T extend across the slit 52A, and is made to run in the direction of the arrow β in the drawing.

On the end plane on the downstream side of the lower base 52 (extended edge of the slit 52A), a restraint section CTL is attached, which the restraint section CTL is made of a plate material of another member disposed substantially on the same plane as the surface of the lower base 52. The restraint section CTL is formed having a side wall 60 that has an outline at an angle γ ($0°<γ<90°$) with respect to the extended line toward the downstream side of the slit 52A, seen from a planar view. Accordingly, the restraint section CTL acts so that the side wall 60 extends across, as the slit 52A extends toward the downstream side in its extension toward the downstream side.

The marking device 5 configured as such forms a cut and raised section T0 in the tag T by the upper blade rotating body 51C not illustrated in the slit 52A that is formed by a gap between adjacent lower bases 52, and at the restraint section CTL, the marking device 5 bends the cut and raised section T0 of the tag T by a pressing force accompanying the conveyance of the tag T by the side wall 60.

Figure 13:
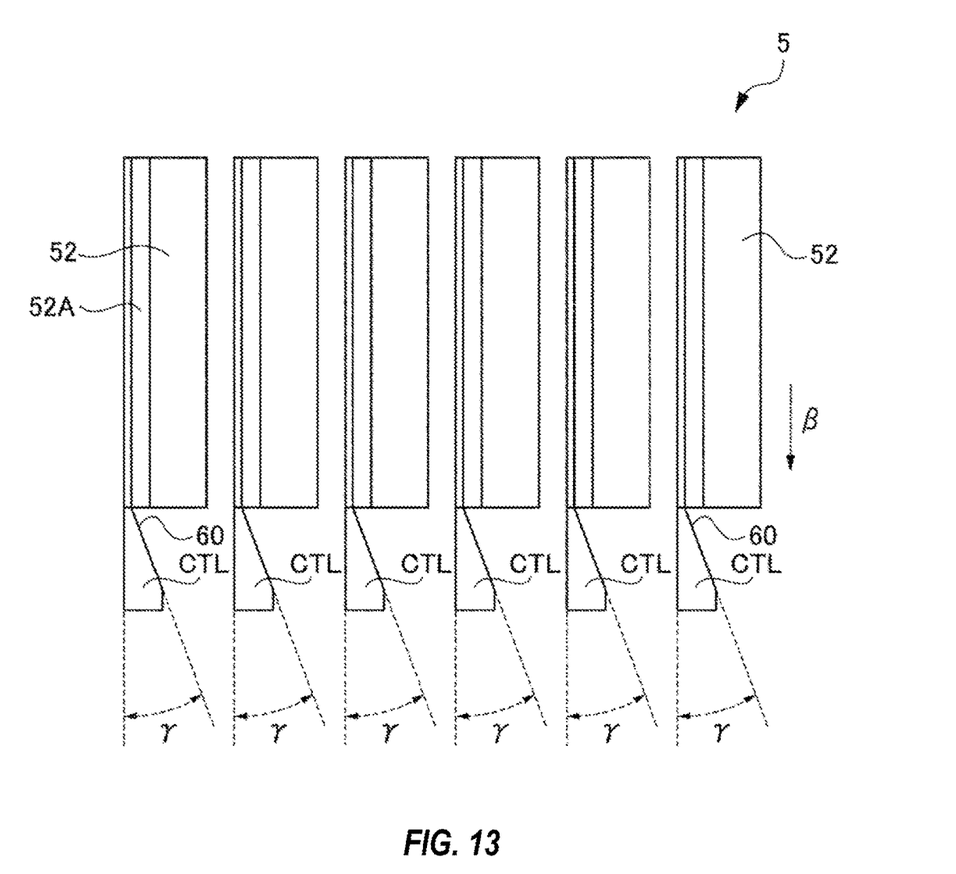
FIG. 13 is a view showing a configuration of a plurality of lower bases disposed corresponding to the upper blade driving devices, according to other embodiments of the marking device.

In a case of configuring as such, the same effect as shown in Embodiment 1 is also attainable. Moreover, as shown in FIG. 13, even if the restraint section CTL made from a plate material of another member is attached to the lower base 52 in which the slit 52A is formed from the upstream side of the tag conveying direction to the downstream side of the tag conveying direction, the same effect is attainable.

It is notable that a roller not illustrated (corresponding to reference sign 53 in FIGS. 5A-5B) disposed on a downstream side of the lower base 52 in the conveying direction and above the restraint section CTL of the plate material of another member is made to securely make a crease on the cut and raised section T0 of the tag T, by pressing the tag T against the lower base 52.

(Embodiment 6)

The aforementioned embodiments are described using the continuous paper P that is formed having a plurality of successive tags T, as an example. However, it is not limited to this, and it is needless to say that this is applicable to continuous paper in which a plurality of labels is successively formed. The main point is that it is applicable as long as it is continuous paper in which a plurality of sheets (tags, labels, etc.) that can be separated into single leafs are formed successively. Furthermore, by changing the number or positions of the cut and raised sections T0 in the tag T, a plurality of defects (reading defects from or writing defects onto the IC chip 15A, printing defect onto the tag T surface, etc.) may be presented.

The above describes the present invention using the embodiments, however it is needless to say that the technical scope of the present invention is not limited to the scope described in the above embodiments. It is clear to a person skilled in the art that various changes or modifications may be made to the embodiments. Moreover, it is clear from the recitation of the claims that forms adding such changes or modifications may also be within the technical scope of the present invention.

(Appendix 1)

As aforementioned, the present invention is not limited to the above embodiments, and may be freely changed and modified without departing from the scope of the invention. The following append, as Appendix 1, means 1 to 8 recited in the "Solution to Problem" of the original specification of Application 1 (Japanese Patent Application No. 2014-61572) that serves as the basis of the priority claims of the present application.

(Appendix means 1) A marking device according to a first aspect of the present invention is a marking device for forming a cut and raised section to a defective tag, the marking device characterized by including: a lower base on which a plurality of successive tags are conveyed; an upper blade disposed above the lower base, adapted to make a cut in a tag having been found a defect among a plurality of tags; and a slit provided in the lower base corresponding to the upper blade, allowing for the upper blade to be accepted therein on an upstream side in a conveying direction of the tag and form a cut and raised section of the tag, the slit including a restraint section on a downstream side in the conveying direction of the tag, the restraint section adapted to press the cut and raised section of the tag in a bending direction along with the conveying of the tag.

(Appendix means 2) The marking device of the present invention is characterized in that, in the configuration of (Appendix means 1), the restraint section is formed by gradually narrowing a width of the slit toward the downstream side in the conveying direction of the tag.

(Appendix means 3) The marking device of the present invention is characterized in that, in the configuration of (Appendix means 1), the restraint section is formed by an angled end section of the slit on the downstream side in the conveying direction of the tag.

(Appendix means 4) The marking device of the present invention is characterized in that, in the configuration of any one of (Appendix means 1) to (Appendix means 3), the marking device further includes a roller disposed above the restraint section, disposed to securely make a crease on the cut and raised section by pressing the tag against the lower base.

(Appendix means 5) The marking device of the present invention is characterized in that, in the configuration of any one of (Appendix means 1) to (Appendix means 4), a plural number of the upper blade and the slit adapted to accept the upper blade is provided in a direction intersecting at right angles to the conveying direction of the tag.

(Appendix means 6) The marking device of the present invention is characterized in that, in the configuration of (Appendix means 4), the marking device further includes a cutting and stacking section adapted to cut and stack the plurality of tags having passed a disposed location of the roller.

(Appendix means 7) A marking method according to a second aspect of the present invention is a marking method for forming a cut and raised section to a defective tag, the method characterized by including: a step of conveying a plurality of successive tags on a lower base; a step of making a cut in a tag having been found a defect from among the plurality of tags, using an upper blade disposed above the lower base; a step of forming a cut and raised section in the tag with a slit formed in the lower base corresponding to the upper blade, allowing for accepting the upper blade on an upstream side in a conveying direction of the tag; and a step of pressing the cut and raised section of the tag in a bending direction by a restraint section provided on a downstream side of the slit in the conveying direction of the tag, along with the conveying of the tag.

(Appendix means 8) The marking method of the present invention is characterized in that, in the configuration of (Appendix means 7), the method further comprises a step of securely making a crease on the cut and raised section by using a roller disposed above the restraint section, by pressing the tag against the lower base.

(Appendix 2)

Next appends means 1 to 9 recited in the "Solution to Problem" in the original specification of Application 2 (Japanese Patent Application No. 2014-71344) that serves as the basis of the priority claims of the present application, as Appendix 2.

(Appendix means 1) A marking device according to a first aspect of the present invention is a marking device to use with a sheet, characterized by including: cut and raising means adapted to form, as a failure process, a cut and raised section positioned on an edge of a sheet having been found a defect.

(Appendix means 2) The marking device of the present invention is characterized in that, in the configuration of (Appendix means 1), the sheet includes an RFID.

(Appendix means 3) The marking device of the present invention is characterized in that, in the configuration of (Appendix means 1) or (Appendix means 2), the cut and raising means forms a plural number of the cut and raised section.

(Appendix means 4) The marking device of the present invention is characterized in that, in the configuration of any one of (Appendix means 1) to (Appendix means 3), the cut and raising means includes: a lower base on which the sheet is conveyed; at least one upper blade disposed above the lower base, adapted to make a cut in a sheet having been found a defect; and a slit provided in the lower base corresponding to the upper blade, allowing for the upper blade to be accepted therein on an upstream side in a conveying direction of the sheet, the slit including a restraint section on a downstream side in the conveying direction of the sheet, the restraint section adapted to press the cut and raised section of the sheet in a bending direction along with the conveying of the sheet.

(Appendix means 5) The marking device of the present invention is characterized in that, in the configuration of (Appendix means 4), the restraint section has an outline inclining to an inner side of the sheet in a planar view, toward a downstream side in a conveying direction of the sheet.

(Appendix means 6) The marking device of the present invention is characterized in that, in the configuration of (Appendix means 4) or (Appendix means 5), the marking device further includes a roller disposed above the restraint section, disposed to further make a crease on the cut and raised section by pressing the sheet against the lower base.

(Appendix means 7) A marking method according to a second aspect of the present invention is a marking method to use with a sheet, and is characterized by including: a cutting and raising step of forming, as a failure process, a cut and raised section positioned on an edge of the paper having been found a defect.

(Appendix means 8) The marking method of the present invention is characterized in that, in the configuration of (Appendix means 7), the cutting and raising step includes: a step of conveying the sheet on the lower base; a step of making a cut in the sheet having been found a defect, by using at least one upper blade disposed above the lower base; a step of forming a cut and raised section of the sheet by a slit provided in the lower base corresponding to the upper blade, the slit allowing for the upper blade to be accepted therein on an upstream side in a conveying direction of the sheet; and a step of pressing the cut and raised section of the sheet in a bending direction along with the conveying of the sheet, by a restraint section provided on a downstream side of the slit in the conveying direction of the sheet.

(Appendix means 9) The marking method of the present invention is characterized in that, in the configuration of (Appendix means 8), the method further includes a step of further making a crease on the cut and raised section by using a roller disposed above the restraint section, by pressing the sheet against the lower base.

REFERENCE SIGNS LIST

1: continuous paper feeding device, 2: encoding device, 3: printing device, 4: inspection device, 5: marking device, 6: continuous paper discharging device, 7: cutting and stacking section (device), 7A: box body, 10: tag forming device, 11: barcode, 12: number, 13: letter, 15: RFID inlay, 15A: IC chip, 15B: antenna, 51: upper blade driving device, 51A: clutch, 51B: gear, 51C: upper blade rotating body, 51D: supporting body, 51E: upper blade, 51G: central axis, 52: lower base, 52A: slit, 53: roller, 60: side wall, P: continuous paper, T: RFID tag (sheet), L: tag cutting line, T0: cut and raised section, TH: tag hole, SH: sprocket hole, CTL: restraint section, BD: bent section, I,O: inner side surface

The invention claimed is:

1. A marking device to use with a sheet, comprising:
a cut and raising part configured to make a cut to form a cut and raised section on the sheet having been found to have a defect and to press the cut and raised section in a bending direction as the sheet is conveyed to make the cut and raised section stand.

2. The marking device according to claim 1, wherein the cut and raised section is formed at an edge of the sheet.

3. The marking device according to claim 1, wherein the sheet includes a radio frequency identification (RFID) inlay.

4. The marking device according to claim 1, wherein the cut and raising part is configured to form a plurality of cut and raised sections.

5. The marking device according to claim 1, wherein the cut and raising part comprises:
a base along which the sheet is conveyed;
a blade disposed adjacent the base and configured to make the cut in the sheet having been found to have the defect; and
a slit defined by the base configured to receive the blade therein on an upstream side in a conveying direction of the sheet.

6. The marking device according to claim 5, wherein the slit includes a restraint section on a downstream side in the conveying direction of the sheet, and the restraint section is configured to press the cut and raised section of the sheet in the bending direction as the sheet is conveyed.

7. The marking device according to claim 6, wherein the restraint section includes an outline inclining to an inner side of the sheet in a planar view, toward the downstream side in the conveying direction of the sheet.

8. The marking device according to claim 6, further comprising a roller disposed adjacent to the restraint section, wherein the roller is configured to make a crease on the cut and raised section by pressing the sheet against the base.

9. The marking device according to claim 8, further comprising a cutting and stacking section located downstream of the roller and configured to cut and stack the sheet.

10. The marking device according to claim 6, wherein the restraint section is formed by narrowing a width of the slit toward the downstream side in the conveying direction of the sheet.

11. The marking device according to claim 6, wherein the restraint section is formed by an angled end section of the slit on the downstream side in the conveying direction of the sheet.

12. The marking device according to claim 5, further comprising at least one additional blade and at least one additional slit configured to receive the at least one additional blade, wherein the at least one additional blade and the at least one additional slit are provided in a direction intersecting at a right angle to the conveying direction of the sheet.

13. A marking method to use with a sheet, comprising:
making a cut to form a cut and raised section on the sheet having been found to have a defect, and
pressing the cut and raised section in a bending direction as the sheet is conveyed to make the cut and raised section stand.

14. The marking method according to claim 13, wherein the cut and raised section is formed at an edge of the sheet.

15. The marking method according to claim 13, wherein the sheet includes a radio frequency identification (RFID) inlay.

16. The marking method according to claim 13, wherein forming the cut and raised section comprises:
conveying the sheet on a base;
making the cut in the sheet having been found to have the defect using a blade disposed adjacent to the base; and
forming the cut and raised section of the sheet by receiving the blade in a slit in the base, the slit provided on an upstream side in a conveying direction of the sheet.

17. The marking method according to claim 16, further comprising pressing the cut and raised section of the sheet in a bending direction by a restraint section of the slit provided on a downstream side in the conveying direction of the sheet as the sheet is conveyed.

18. The marking method according to claim 17, further comprising making a crease on the cut and raised section by pressing the sheet against the base using a roller disposed adjacent to the restraint section.

19. The marking method according to claim 13, further comprising cutting the sheet having the cut and raised section into a plurality of single leafs, and stacking the plurality of single leafs.

20. The marking method according to claim 13, wherein the sheet comprises a continuous paper including a plurality of tags formed successively in a conveying direction of the sheet.

21. The marking method according to claim 20, further comprising:
cutting the sheet to separate individual tags; and
stacking the individual tags in a stacked configuration,
wherein in the stacked configuration, the cut and raised section of an individual tag having been found to have the defect includes the cut and raised section remains standing.

22. A marking device to use with a sheet, comprising a cut and raising part including:
a cutting part configured to make a cut section in the sheet having been found to have a defect,
a bending part provided on a downstream side of the cutting part in a conveying direction of the sheet and configured to bend the cut section in a direction which makes the cut section stand from a surface of the sheet having been found to have the defect to form a cut and raised section.

23. The marking device according to claim 22, wherein the cutting part comprises:
a base along which the sheet is conveyed;
a blade disposed adjacent the base and configured to make the cut section in the sheet having been found to have the defect; and
a slit defined by the base configured to receive the blade on an upstream side in the conveying direction of the sheet.

24. The marking device according to claim 23, wherein the slit includes a restraint section on a downstream side in the conveying direction of the sheet, and the restraint section is configured to press the cut and raised section of the sheet in a bending direction as the sheet is conveyed.

25. The marking device according to claim 22, wherein the sheet comprises a continuous paper including a plurality of tags formed successively in a conveying direction of the sheet.

26. A tag forming device comprising:
the marking device according to claim 3;
a continuous paper feed device configured to feed the sheet;
an encoder configured to read information from and write information to an IC chip in the RFID inlay; and
a printer;
an inspection device to detect the defect in the sheet.

* * * * *